United States Patent Office 2,748,524
Patented June 5, 1956

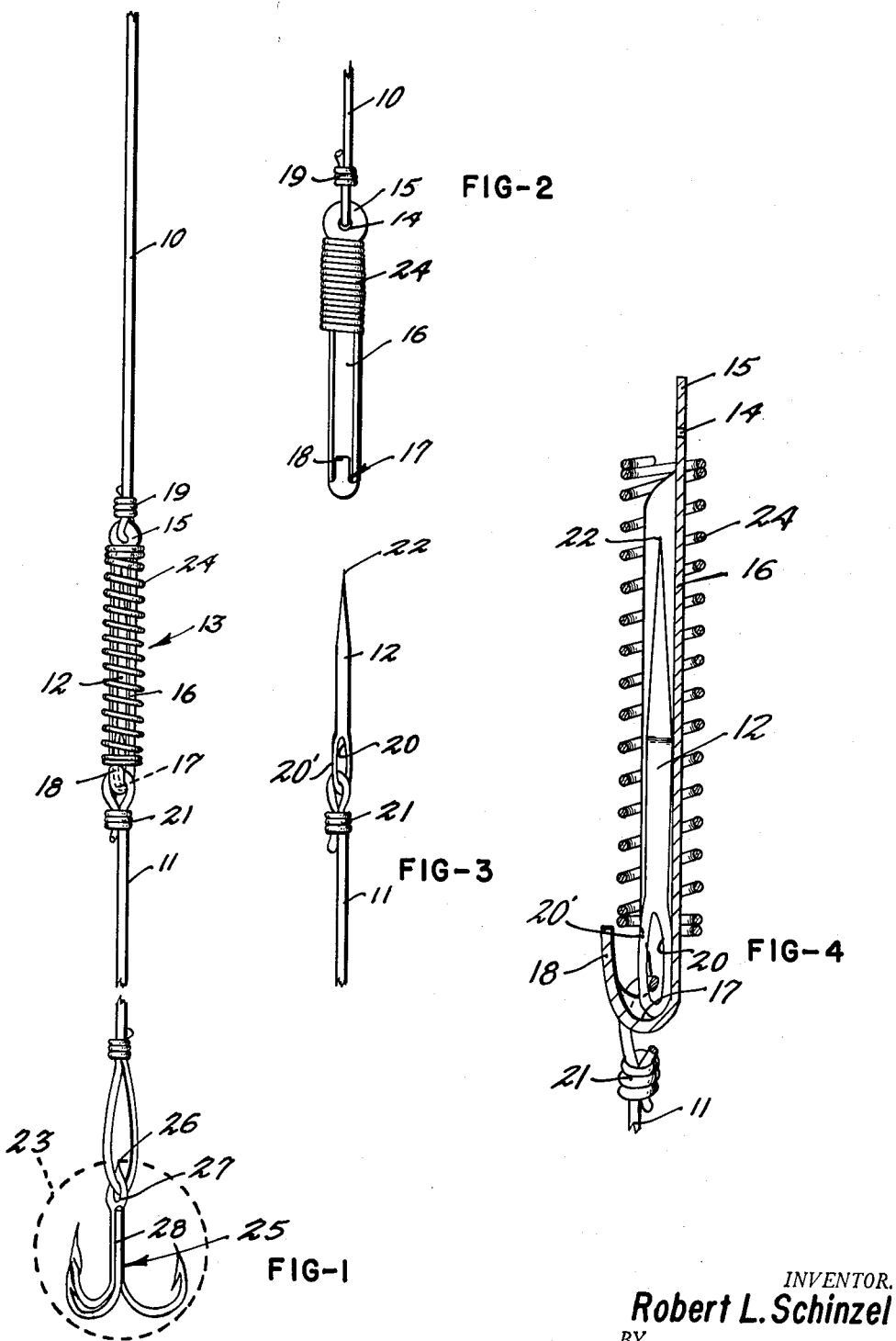

2,748,524
FISHING LINE COUPLER

Robert L. Schinzel, Spokane, Wash.

Application November 14, 1952, Serial No. 320,413

2 Claims. (Cl. 43—44.83)

This invention relates to fishing equipment and more particularly to a line coupler.

The primary object of the invention is to produce a coupler intermediate a fishing line or leader which may be easily separated for the purpose of threading the bait over the line or leader and on to the hook where it is less apt to be lost or stolen by the fish.

Another object of the invention lies in the provision of a coupler having a needle containing channel and a helical spring which associate to secure a needle in the channel, thus coupling two sections of a fishing line or leader.

Another object of the invention lies in the provision of a fishing line coupler which is not liable to become separated accidentally.

Another object of the invention lies in the provision of a coupler which is manufactured with facility from a minimum number of parts and which is very inexpensive to produce.

These and other objects of the invention will become aparent during the course of the following description.

In the accompanying drawings, forming a part of this specification, and in which like numerals are employed to designate like parts, Figure 1 is a view in elevation showing a fishline having a hook at one end and the coupler of my invention interconnecting adjacent ends of a leader and a line;

Figure 2 is a view of the channel and helical spring as separated from the needle;

Figure 3 is an elevation of the needle apart from the channel; and

Figure 4 is a longitudinal cross section of my improved coupler.

Refrring now more particularly to the drawings, I have shown a sectional fishing line 10 which may have the inner section associated with the reel of the fishing equipment, and in such case ordinarily the outer section or leader 11 will be secured to the needle 12 which is seen to be substantially the same diameter as the line 10. However, the coupler indicated in general by the numeral 13 may couple segments of a length of the leader or segments of a length of the line as desired by the individual fisherman.

The line is secured in an eye 14 formed in a disc-shaped head 15 carried at one end of the channel 16. In cross section the channel is U-shaped and at its lower end is provided with a pocket as at 17 defined by a tongue 18 extending parallel with the longitudinal axis of the channel 16 and spaced thereabove. This may be secured to the line 10 by any suitable knot 19 or coupler desired. The leader 11 is secured in an eye 20 formed in the head 20' of needle 12 as by knot 21 or other means, and the needle is provided at its oposed end with a sharp point 22 which is adapted to penetrate the bait, here shown in dotted line in Figure 1 at 23 as being a salmon egg or the like. Of course, it will be understood that other forms of bait may be used if desired.

To unite the elements of the coupler the needle 12 is nested in the channel 16 as shown in Figures 1 and 4 with its head 20' disposed in the pocket 17 of the channel 16, and the loop of leader 11 passing through the eye 20 will be disposed as shown in Figure 1 encircling the tongue 18. A helical expansion spring 24 encircles the channel 16 longitudinally thereof and has one end bearing against the head 15 and the other end confined by tongue 18 against removal from the channel body. To apply or remove the needle 12 from the channel, it is only necessary to compress the helical expansion spring 24 as shown in Figure 2. The needle head 20' may then be removed from the pocket 17 and the line and leader will be separated. The needle 12 may then be pressed through the bait point first and the bait threaded over leader 11 on to the ganged hook 25 which has a pointed loop 26 containing the eye 27 to which the lower end of the leader 11 is secured, thus facilitating application of the bait in covering relation to the hook without materially distorting the shape or appearance of the bait.

I have found in actual practice that the bait is so seldom lost when a fish is not hooked as to be considered nearly impossible for the fish to take the bait without being hooked since the bait is applied over the shank 28 of the hook and since the fish cannot remove the bait without pulling toward the points of the barbs of the hook with sufficient force to break the bait, and this force is found to be adequate to hook the fish.

Having thus described my invention, I claim:

1. A fishing line coupler comprising an elongated channel member having a back wall and spaced parallel upstanding side walls, a disc-shaped head at one end of the channel member and extending from the back wall thereof in a plane parallel to the longitudinal axis of said channel member, said head having an eye for securing the channel to a line, a tongue spaced from the back wall of the channel, said tongue and back wall defining a pocket therebetween, a needle removably nested in said channel, a point on one end of the needle, a head on the opposed end of the needle, said head having an eye for securing a leader, and a helical expansion spring encircling said channel and needle and biased against said head and toward said tongue for releasably securing said needle and channel together with the head confined in said pocket.

2. A fishing line coupler comprising a channel member having an enlarged head on one end thereof, said head having an eye for securing the channel member to a line, said channel member including a portion at the opposite end thereof having a tongue spaced from the back wall of the channel member and defining a pocket therebetween, a peripherally smooth pointed needle removably nested in said channel member, and a helical expansion spring encircling said channel member and needle and biased against said head and toward said tongue for releasably securing said needle and channel member together with the needle having an eye portion confined in said pocket, and adapted to retain the looped end of a leader linked through said eye portion.

References Cited in the file of this patent

UNITED STATES PATENTS

| | | |
|---|---|---|
| 13,672 | Welton | Oct. 9, 1855 |
| 373,535 | Penfield | Nov. 22, 1887 |
| 885,267 | Martel | Apr. 21, 1908 |
| 1,490,251 | Adams | Apr. 15, 1924 |
| 2,128,315 | Parker | Aug. 30, 1938 |
| 2,251,319 | Brewer | Aug. 5, 1941 |
| 2,320,546 | Shakespeare | June 1, 1943 |
| 2,562,605 | Embree et al. | July 31, 1951 |